United States Patent [19]

Richards

[11] 4,277,172

[45] Jul. 7, 1981

[54] SOFT CONTACT LENS APPARATUS

[75] Inventor: William D. Richards, Medway, Mass.

[73] Assignee: American Optical Corporation, Southbridge, Mass.

[21] Appl. No.: 91,317

[22] Filed: Nov. 5, 1979

[51] Int. Cl.[3] .............................................. G01N 21/13

[52] U.S. Cl. .................................... 356/244; 350/245; 356/125

[58] Field of Search ......................... 356/244, 124–127, 356/30–31; 350/245

[56] References Cited

U.S. PATENT DOCUMENTS

| | | | |
|---|---|---|---|
| 2,960,909 | 11/1960 | Shipley, Jr. | 356/30 |
| 3,904,276 | 9/1975 | Whitaker et al. | 350/252 |
| 3,985,445 | 10/1976 | Tagnon | 356/125 |

FOREIGN PATENT DOCUMENTS

| | | | |
|---|---|---|---|
| 512873 | 5/1955 | Canada | 356/124 |
| 430551 | 8/1911 | France | 350/257 |

OTHER PUBLICATIONS

Birch, K. G., "The Construction & Proving of Three 50 mm Focal Length Standard Reference Lenses", Optica Acta 1971, pp. 139–147.

*Primary Examiner*—William H. Punter
*Attorney, Agent, or Firm*—Alan H. Spencer

[57] ABSTRACT

Improved apparatus for transporting and positioning a contact lens immersed in a liquid for inspection is disclosed. The device has a plurality of supporting surfaces and a weight to biase the lens against the surfaces during immersion and prevent unintentional motion of the lens in the liquid during inspection.

8 Claims, 4 Drawing Figures

SOFT CONTACT LENS APPARATUS

BACKGROUND OF THE PRESENT INVENTION

The present invention relates to the immersed inspection of contact lenses and more particularly to devices which expedite positioning a soft contact lens for inspection while the lens is immersed in a liquid.

It is well known that the inspection of soft contact lens parameters is most accurately conducted while a lens is immersed in a liquid. Since soft contact lenses usually contain 35% to 60% water, and the remaining material has a density only slightly different from that of water, it is very time consuming and frequently difficult to accurately position a contact lens immersed in an aqueous medium.

U.S. Pat. No. 3,985,445, issued Oct. 12, 1976, discloses a device for inspecting contact lenses while immersed in a liquid. The patent also discloses apparatus for centering the lens for inspection. The centering apparatus has cylindrical side walls which are adapted to engage or be very slightly larger than the perimeter of the contact lens to be inspected. Since lens diameters differ, a plurality of inserts of varying side wall dimensions are required. The device is adapted to engage a pedestal which is orthogonally movable by means of micrometer screws in order to be aligned on the instrument axis.

An apparatus such as that described in the aforementioned patent is susceptible to distortion of the lens during inspection when the diameter of the apparatus is even slightly less than the lens and inadequate centering when the lens diameter is more than very slightly less than the diameter of the centering apparatus. Also, because of the close proximity of the lens perimeter to the inner wall of the centering apparatus, it is not possible to accurately measure the actual lens diameter in the same inspection device.

BRIEF DESCRIPTION OF THE PRESENT INVENTION AND DRAWINGS

It is an object of the present invention to provide an improved device for transporting and positioning soft contact lenses for inspection.

It is another object of the present invention to provide a device capable of handling soft contact lenses of varying diameters.

It is a further object of the present invention to provide a handling and centering device for soft contact lenses that does not interfere with lens diameter measurements.

It is a still further object of the present invention to provide a device which prevents unintentional movement of an immersed contact lens during positioning and inspection.

It is a still further object of the present invention to provide a handling and centering device for contact lenses that is capable of handling a plurality of lens parameters and types without modification or substitution.

The apparatus of the invention has a plurality of fingers depending from a body which have lens supporting surfaces and a weight which biases a soft contact lens against the supporting surfaces during the immersion process and facilitates centering by preventing unintentional motion of the lens while immersed.

DETAILED DESCRIPTION OF THE PREFERRED EMBODIMENT

Figure 1:
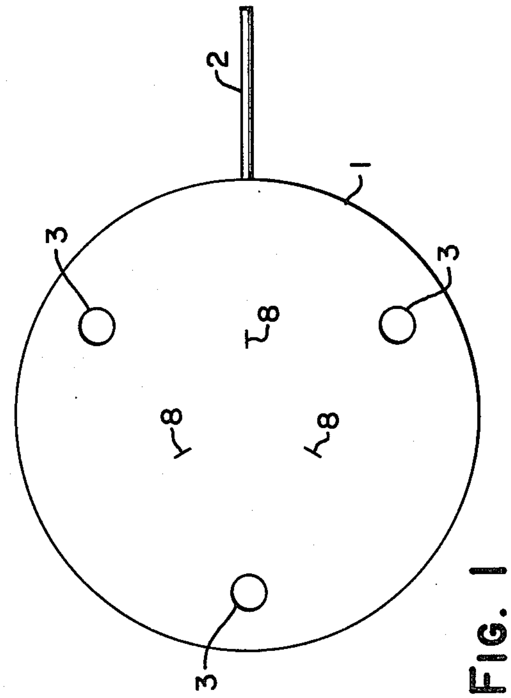
FIG. 1 is a top plan view of an embodiment of the present invention.
Figure 2:
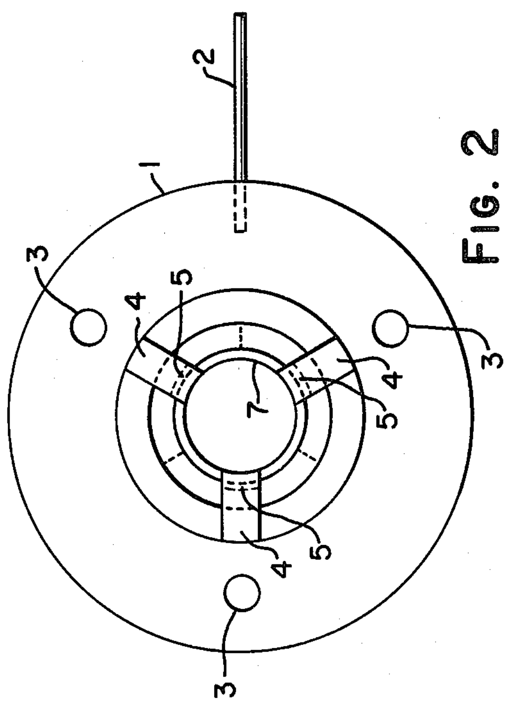
FIG. 2 is a bottom plan view of an embodiment of the present invention.

Referring to FIGS. 1 and 2, main body 1 has handle 2 extending therefrom and a plurality of vents 3. Fingers 4 depend from main body 1 and are spaced equidistant about the center of main body 1.

Figure 3:
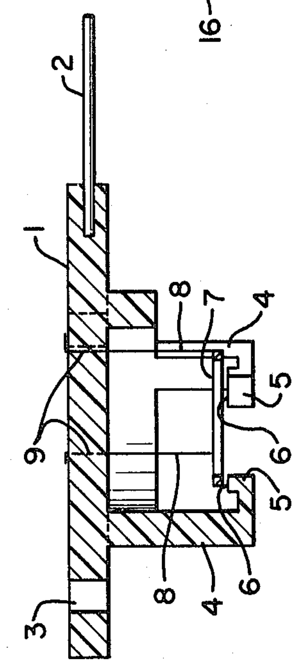
FIG. 3 is a front view in section of an embodiment of the present invention.

Referring to FIG. 3, each of fingers 4 has an inwardly extending flange 5 and lens supporting surface 6. Weight 7 preferably has an outside diameter slightly greater than the inside diameter of flanges 5. The inside diameter of flanges 5 is chosen to be slightly less than the minimum diameter of the various contact lenses to be tested. Usually, soft contact lenses (when hydrated) have a diameter ranging from about 10 mm to 15 mm and the inside diameter of fingers 4 is chosen to provide clearance for the largest lens of the type to be tested. Weight 7 has a plurality of vertically extending filament-like wires 8 each extending through small passages 9 in main body 1 to locate weight 7 laterally while permitting free-vertical movement of weight 7. The lateral location of weight 7 assists in centering the lens by causing the lens to move with weight 7 when main body 1 is moved laterally.

Figure 4:
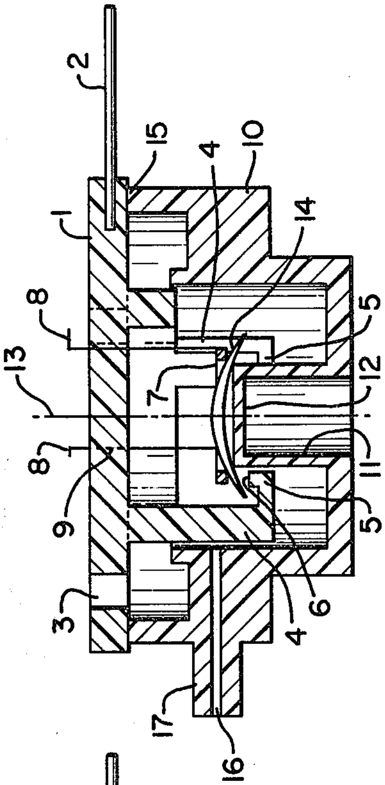
FIG. 4 is a front sectional view of an embodiment of the present invention in combination with a lens support and liquid container.

Referring to FIG. 4, inspection instrument liquid container 10 has a pedestal 11 with window 12 on the top thereof. The pedestal diameter is selected to provide an adequate opening for passage of light along axis 13 during testing. The height of pedestal 11 is chosen to lift soft contact lens 14 and weight 7 out of contact with supporting surfaces 6 as main body 1 is lowered into contact with rim 15 of container 10. Passage 16 extending through nipple 17 of container 10 is used to supply liquid (not shown) to container 10. Preferably, the inside diameter of weight 7 is chosen to be approximately the same as the outside diameter of pedestal 11 in order that weight 7 causes minimal distortion of soft contact lens 14 when it is resting on pedestal 11.

What is claimed is:

1. Apparatus for transporting a soft contact lens and positioning the lens in a liquid for inspection which, comprises a main body member, a plurality of depending fingers extending from said member, each of said fingers having a lens supporting surface, said plurality of fingers defining a discontinuous recepticle for receiving the lens with clearance therearound, and weight means being adapted to rest on a lens positioned in the recepticle for reducing unintentional mvoement when immersed in the liquid.

2. The apparatus according to claim 1 wherein there are three fingers.

3. The apparatus according to claim 1 wherein said weight means is ring shaped.

4. The apparatus according to claim 2 wherein said weight means is ring shaped.

5. The apparatus according to claim 2 wherein each finger has a flange extending into the recepticle.

6. The apparatus according to claim 4 wherein said main body has a plurality of parallel passages and a plurality of parallel longitudinal members extending upwardly from said weight means slidably engaging said passages.

7. A combination which comprises a lens inspection device having an optical axis, a container with a liquid located on said axis, a pedestal on said axis and immersed in the liquid for supporting a lens during inspection and the apparatus of claim 1.

8. A combination which comprises a lens inspection device having an optical axis, a container with a liquid located on said axis, a pedestal on said axis and immersed in the liquid for supporting a lens during inspection and the apparatus of claim 4.

* * * * *